Inventors
KENNETH FRANK Hall
GEORGE CHAMBERS
By Browne Schuyler
Beveridge
Attorney

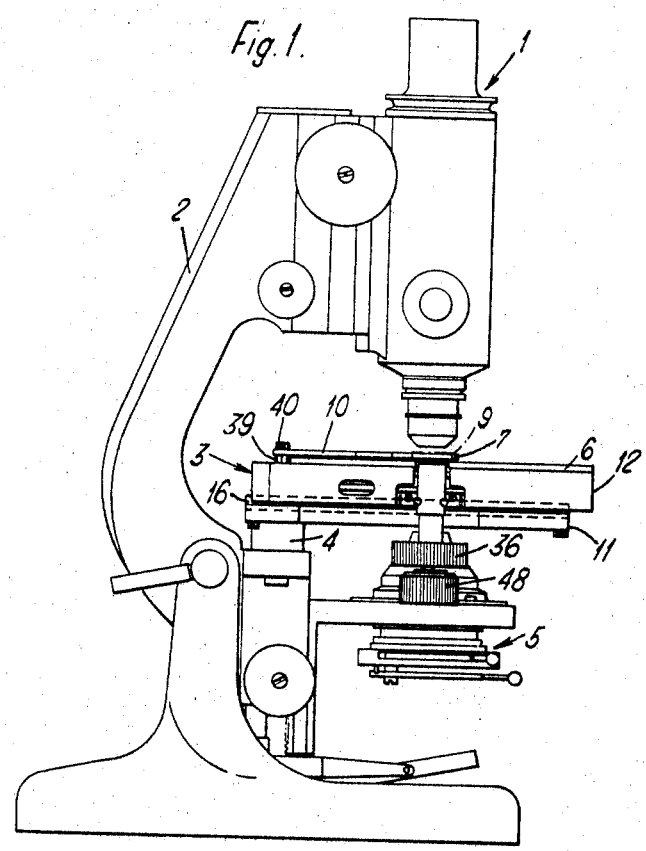
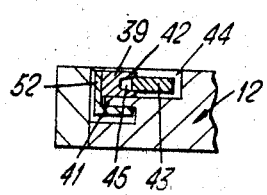

United States Patent Office 3,428,387
Patented Feb. 18, 1969

3,428,387
FRICTION DRIVEN MICROSCOPE STAGES
Kenneth Frank Hall and George Chambers, Barnet, England, assignors to W. Watson & Sons Limited
Filed Apr. 7, 1964, Ser. No. 358,396
Claims priority, application Great Britain, Apr. 10, 1963, 14,437/63
U.S. Cl. 350—86          10 Claims
Int. Cl. G02b 21/26, 21/34

ABSTRACT OF THE DISCLOSURE

A microscope stage includes a stationary bottom plate and middle and upper plates movable in perpendicular directions. Both plates have friction drives from coaxial control knobs. The middle plate is driven by a friction wheel resiliently urged into frictional engagement with an elongated rod fixed to the bottom plate and the upper plate is driven by an annular friction ring, concentric with an aperture in the stage, resiliently urged into contact with the upper plate and a second pulley on the middle plate. The bottom plate supports the middle plate at three bearing points and the plates are held together by magnets.

---

The invention relates to microscope stages.

The invention provides, in one of its aspects, a microscope stage comprising at least two members which are urged towards each other by magnetic means, and are arranged for relative movement tranvserse to the direction of the magnetic force.

The invention provides, in another of its aspects, a microscope stage comprising at least two substantially parallel plate-like members arranged face to face, one of which is arranged for movement relative to the other across the face thereof, and magnetic means for urging the two adjacent faces of the plates towards each other.

Preferably, where the plate-like members extend horizontally and one is supported on the other, there is provided at least one bearing between the plate-like members which comprises a bearing member having a face contacting the surface of one of the plate-like members and mounted for rocking movement on the other plate-like member, so that the bearing member may take up a position in which the face thereof rests firmly on the said surface. Preferably three such bearnigs are provided spaced apart over the surface or surfaces.

Preferably there is provided a device for effecting relative movement in a guided direction between said plate-like members, which device comprises a rigid linking member engaged at one position along its length to one of the plate-like members, moving means attached to the other of the plate-like members and frictionally engaged with said linking member for moving it to effect said relative movement, and pressure means attached to the other of the plate-like members and engaged with said linking member to urge it into positive engagement with said moving means.

The invention provides, in another of its aspects, a microscope stage including a device for effecting relative movement in a guided direction between two members, which device comprises a rigid elongated member pivotally attached at one position along its length to one of the aforesaid members and substantially parallel to the aforesaid direction and means attached to the other of the aforesaid members for moving the elongated member longitudinally relative to that other member to effect relative movement as aforesaid. Preferably the moving means comprises a circular member frictionally engaged with the elongated member and means for rotating the circular member with respect to the aforesaid other one of the aforesaid members.

The invention provides, in another of its aspects, a microscope stage including two parts arranged for relative translational movement, and means for effecting relative translational movement of the parts as aforesaid, which means comprises a rotatable member carried by one of the aforesaid parts for rotation with respect thereto and engaging at a position on its circumference with the other aforesaid part or a member carried thereby, and means for rotating the rotatable member as aforesaid thereby to effect relative translational movement of the parts.

Preferably the two parts are each provided with an aperture such that in use of the stage the two apertures overlie each other to allow passage of the optical path of the microscope therethrough, and the rotatable member extends around the aperture.

Preferably the means for rotating the rotatable member includes a second rotatable member drivingly connected to the said rotatable member. Preferably the second rotatable member is positioned on the said one of the parts at a position spaced away around the circumference of the aforesaid other rotatable member from the position at which it engages the aforesaid other part of the stage. Preferably the second rotatable member is coaxial with a third rotatable member rotation of which is adapted to effect a further movement associated with the microscope e.g. movement of the stage or part of it in a direction transverse to the aforesaid direction of relative movement.

Some specific embodiments of the invention will now be described by way of example and with reference to the accompanying drawings in which:

FIGURE 1 is a side-view of a microscope incorporating three-part microscope stage according to the invention;

FIGURE 4 is a sectional view on the line A—A of FIGURE 2;

FIGURE 5 is an enlarged view of part of the mechanism shown in FIGURE 3.

Figure 2:
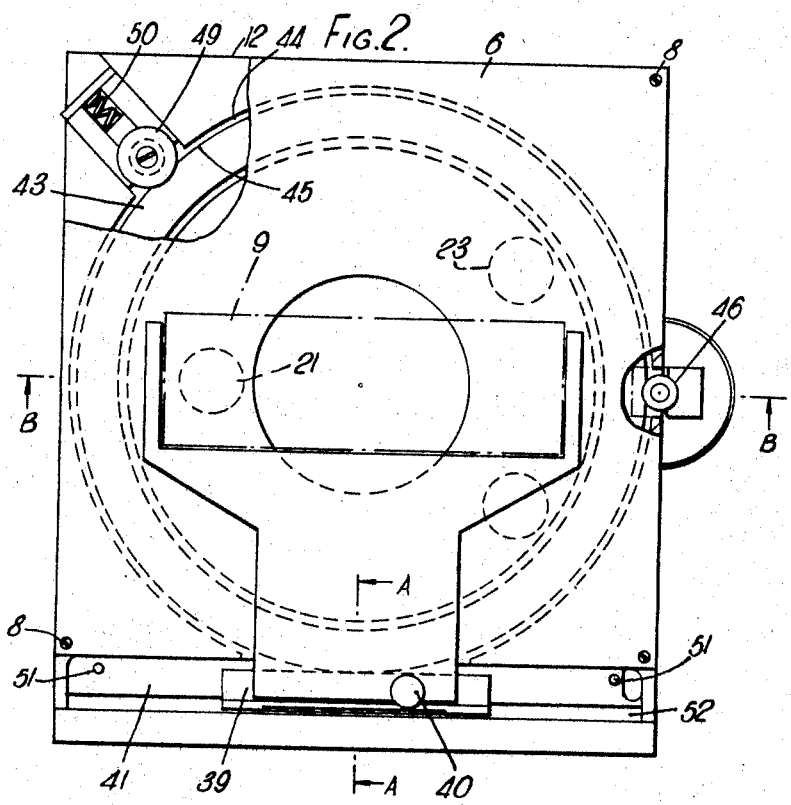
FIGURE 2 is a part-sectional plan view of the three-part microscope stage shown in FIGURE 1.
Figure 3:
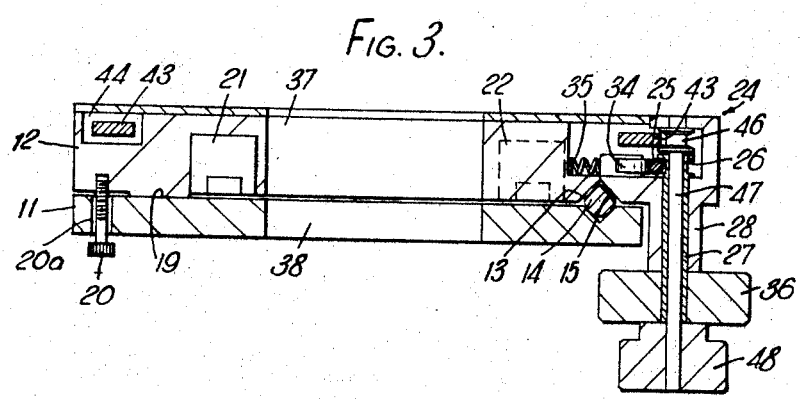
FIGURE 3 is a sectional elevation on the line B—B of FIGURE 2.

The microscope illustrated in FIGURE 1 comprises a viewing optical system 1 supported by a stand 2, which also carries a transmitted light stage assembly 3 mounted upon a bracket 4, together with a light system 5 including a mirror and a condenser lens. The upper surface of the stage assembly 3 is formed by an apertured cover plate 6 on which rest specimen locating fingers 7, one on either side of the central aperture, and the cover plate is fixed by screws 8 around the edge of the assembly, but in FIGURE 2 portions of the cover plate are removed to show the underlying features. A specimen slide 9 placed between the fingers 7, may be viewed through the optical system 1, utilising the light system 5.

The microscope stage assembly 3 comprises three plates, a bottom plate 11, a middle plate 12, and an upper plate 10. The bottom plate 11 is secured by the bracket 4 to the stand 2 of the microscope. The middle plate 12 is guided by means of a V-groove 13 on its underside, which receives a rail 14 secured at each end to the upper side of the bottom plate 11, to slide across the bottom plate. A portion 15 of the length of the rail is relieved so that only two portions at each end of the rail contact the V-groove 13. Towards the edge of the upper side of the bottom plate remote from the rail 14 is provided a strip of P.T.F.E. material. The strip 18 is parallel to the rod 14 and it may be inset into the bottom plate so that its flat upper surface is flush with the surface of the plate. A bearing 19 is provided by a raised portion of the lower side of the surface of the middle plate 12. This abuts the P.T.F.E. strip and is positioned midway between the ends of the plate 12. The bearing 19 and end of the rail 14 together form three sliding bearings between the middle and lower plates, to allow the middle plate to slide on the bottom plate along the direction of the rail 14 and the P.T.F.E. strip. A retaining screw 20 mounted on the middle plate 12 extends through a slot 20a in the bottom plate, to prevent accidental displacement of the middle plate from the bottom plate, and the two plates are urged together in a face-to-face direction transverse to the direction of sliding movement by magnetic means which comprises three permanent magnets 21, 22 and 23 inlet into the lower surface of middle plate 12, the bottom plate 11 being constructed of ferromagnetic material. Means 24 for effecting relative movement as aforesaid between the middle and bottom plates comprises a rail 25 which is attached to the bottom plate and engaged by a friction wheel device carried by the middle plate. The friction wheel is in the form of a V pulley 26 formed as the upper end of a vertical shaft 27 journaled in an overhanging extension 28 of the middle plate. The rail 25 is shaped with a flat portion allowing the rail 25 to sit in firm frictional engagement with the pulley 26. The rail 25 is attached to the bottom plate as illustrated in FIGURE 5, the end 29 of the rail being formed as or being secured to a ball 31 which is received in a recess 32 in the bottom plate 11 and retained by a spring clip 33. A pressure roller 34 carried on the middle plate is opposite V pulley 26 and urged by means of a spring 35 to press the rod 25 into frictional engagement with the V pulley 26. Secured to the lower end of the shaft 27 is a knurled knob 36. Rotation of this knob moves the middle plate 12 smoothly across the bottom plate 11 over a limited distance.

The stage of this example is a transmitted-light stage. The middle plate is provided with a central aperture 37, which overlies a corresponding aperture 38 in the bottom plate. The top plate 10 terminates in the form of fingers 7 shaped to position a specimen slide 9 over the apertures. The fingers may be formed as separate members adjustably mounted on the top plate to allow different sizes of slide to be used. The top plate 10 is arranged to slide across the middle plate in a direction at right angles to the movement between the middle and bottom plates, being detachably mounted on a block 39 by means of a knurled screw 40. The side of the block 39 facing towards the aperture 37 engages with a flange 41, as shown in FIGURE 4, and is formed with a V-section groove 42 extending the length of the block. A circular rotatable ring 43 concentric with the aperture 37 is received within a circular recess 44 in the middle plate. The outer periphery 45 of the ring 43 frictionally engages the V groove 42 in the block 39 at a position midway along one edge of the middle plate. Midway along an adjacent edge of the middle plate a V pulley 46 frictionally engages the outer periphery 45 of the ring 43. The pulley 46 is secured to a shaft 47 coaxial with and journaled within the shaft 27. A knob 48 is secured to the lower end of the shaft 47. At the corner of the middle plate remote from the pulley 46 and the block 39 is provided a pressure pulley 49 which engages the outer periphery 45 of ring 43. The pulley 49 is urged by a spring 50 towards the centre of the ring and thus presses the ring 43 into frictional contact with the drive pulley 46 and the driven V block 39. The side of the block 39 remote from the ring 43 bears against a strip 52 of P.T.F.E. material secured to the middle plate, which reduces friction between the block 39 and the middle plate. Rotation of the pulley 46 by means of the knob 48 causes rotation of the ring 43 and consequent movement of the top plate and specimen slide 9, with the block 39, across the middle plate between the stops 51. The top plate may be made of or may incorporate a magnetic portion to co-operate with a further magnet in the middle plate 12.

A clamping device may be provided to damp the rotation of the shafts 27 and 47, since there is little friction to impede the sliding movements of the middle and top plates for example, the inner shaft may have a central bore which carries a spindle, the upper end of which is secured against rotation in an upper part of the middle plate 12, the knob 48 being hollowed to receive a disc secured to the bottom of the spindle, the space between the disc and the interior of the knob 48 being filled with a viscous silicon fluid. Likewise, a cylindrical cavity may be formed in part of the bottom plate surrounding part of the outer shaft 27 and filled with viscous silicon fluid. The drag exerted by the silicon fluid on the moving surface damps the motion of the moving part and thus the movement of the appropriate part of the stage.

The invention is not restricted to microscope stages of the transmitted light type, nor is it limited to the details of the foregoing example. For use in a metallurgical stage intended to support a specimen for examination by reflected light central aperture in the plates is not required, but the stage must be of rugged construction to support the heavy weight which may be provided by a metallurgical specimen. As there is no central aperture such a stage may utilise a top plate having a shape generally similar to that of the middle and bottom plates, similar magnetic means may be used to urge the plates together.

Instead of employing a plate of magnetic material to co-operate with the magnet, a non-magnetic plate may be provided with magnetic strips positioned to co-operate with the magnet. Where a heavy load is to be carried, the V-groove 13 round guide rail 14 may be replaced by a rectangular guide with separate self-aligning bearings instead of the end portions of the rail 14 in the embodiment described. Such bearings may be made self-aligning by mounting each flat bearing pad on a ball and may be surfaced with P.T.F.E. which has a low coefficient of friction.

A microscope stage in accordance with the present invention is advantageous in that movements in both directions may be controlled by co-axial knobs and are by friction drive, giving smooth motion without hand fitting and lapping needed when racks, pinions or screws are used. The friction drives are spring loaded to take up backlash and wear which may develop. The use of the ring 43 surrounding the aperture in a transmitted light stage makes it possible to have the two milled knobs co-axial, below the stage, and in a convenient working position. By using magnets to hold the top and bottom plates together it is possible to dispense with dovetail slides or other mechanical constraints, so simplifying machining and fitting. By using a rod in a V-groove as a guide, the sideways component of the magnetic pull can be used to remove side play. By relieving the middle of the rod and having a small bearing surface at the other side of the stage, a simple three position contact is produced. Three bearing points are proposed in order that the two plates do not need to be flat to work in a satisfactory manner.

We claim:
1. A microscope stage comprising a support member, a first plate member mounted on the support member and movable relative thereto in a first direction, a second plate member for positioning an object to be viewed, which second plate member is mounted on the first plate member and is movable relative thereto in a second direction perpendicular to the said first direction,
   first drive means for effecting movement between two of the members comprising a first rotatable friction wheel rotatably mounted on one member, an annular friction ring and first urging means resiliently urging the said friction ring into rolling contact with the other of the two members and the said first friction wheel, and second drive means for effecting movement between the other two members.

2. The invention defined in claim 1 wherein said second drive means comprises a second rotatable friction wheel rotatably mounted on one member, a friction rod attached to the other of the two members and second urging means resiliently urging the rod and friction wheel into engagement.

3. A microscope stage as claimed in claim 1 in which the said annular friction ring is rotatably mounted solely by rolling engagement with three abutment members spaced around its periphery, one abutment member being the said first friction wheel, another being the said first urging means and the third being the said member which abuts the ring.

4. A microscope stage as claimed in claim 3 in which the said member which abuts the ring has an elongated groove frictionally engaging the periphery of the ring.

5. A microscope stage as claimed in claim 3 including magnetic means urging the first plate member and support member together.

6. A microscope stage as claimed in claim 4 in which further including magnetic means urging the first and second plate members together.

7. A microscope stage as claimed in claim 1 in which the first plate member is supported on the support member by three spaced bearing means, the plate member being rockably positioned on at least some of the bearing means whereby the first plate member rests firmly on the support member.

8. A microscope stage as claimed in claim 2 in which the first and second friction wheels are mounted on coaxial shafts bearing coaxial control knobs.

9. A microscope as claimed in claim 8 in which damping means are provided to impede rotation of at least one of the said shafts, the damping device comprising a cavity containing viscous fluid surrounding a member which is rotated when the shaft rotates.

10. A microscope stage comprising, in combination
a statutory supporting member having a substantially flat upper surface,
a first movable plate member,
bearing-guide means between said first movable plate member and the said upper surface and constraining movement of said movable plate member for back and forth movement in one direction in a plane parallel to said surface,
magnetic attraction means on said stationary member and said first movable plate member maintaining said movable plate member, said bearing-guide means and said stationary plate member in operative relation,
first friction drive means between said first movable plate member and said stationary plate member, said first friction drive means including a shaft journaled for rotation in said first movable plate member, a friction wheel on an end of said shaft, a friction rod mounted at one end adjacent one side of said stationary plate member, and means biasing said friction rod into frictional driving engagement with said friction wheel, whereby on rotation of said shaft and said friction wheel said first movable plate is moved along said one direction and transversely to the direction of magnetic force of said magnetic attraction means,
a second movable plate member for positioning an object to be viewed,
said second movable plate member being supported above said first movable plate member by means constraining movement of said second movable plate member for back and forth movement in one direction only transverse to the back and forth movement of said first movable plate member, and
second friction drive means, said second friction drive means including a second shaft journaled for rotation in said first movable plate member, a friction wheel on an end of said second shaft, an annular friction ring in engagement with and supported at a first point by said friction wheel, said annular friction ring being in frictional driving engagement with and supported at another point spaced from said first point by a straight portion on said second movable plate member, a freely rotatable roller on said first movable plate member, said freely rotatable roller being in engagement with and supporting said annular friction ring at a third point remote from said first and said second points whereby said annular friction ring is supported at said three points and rotated on rotation of said second shaft to drive said second movable plate member by the action of said annular friction ring on said straight portion of said second movable plate member.

References Cited

UNITED STATES PATENTS

| | | | |
|---|---|---|---|
| 1,891,052 | 12/1932 | Ott | 350—90 X |
| 2,325,239 | 7/1943 | Flint | 350—86 X |
| 2,473,896 | 6/1949 | Mikina | 74—25 X |
| 2,681,592 | 6/1954 | Heine | 350—90 X |
| 2,731,879 | 1/1956 | Conover. | |
| 2,792,711 | 5/1957 | De Mornay | 74—25 |
| 3,204,584 | 9/1965 | Mladjan | 108—143 |
| 3,272,568 | 9/1966 | Koorneef et al. | |

DAVID SCHONBERG, *Primary Examiner.*

PAUL R. MILLER, *Assistant Examiner.*

U.S. Cl. X.R.

108—137; 350—92